May 3, 1949.  C. W. TYDEMAN  2,469,186
HIGH-SPEED GRINDING SPINDLE
Filed June 19, 1947
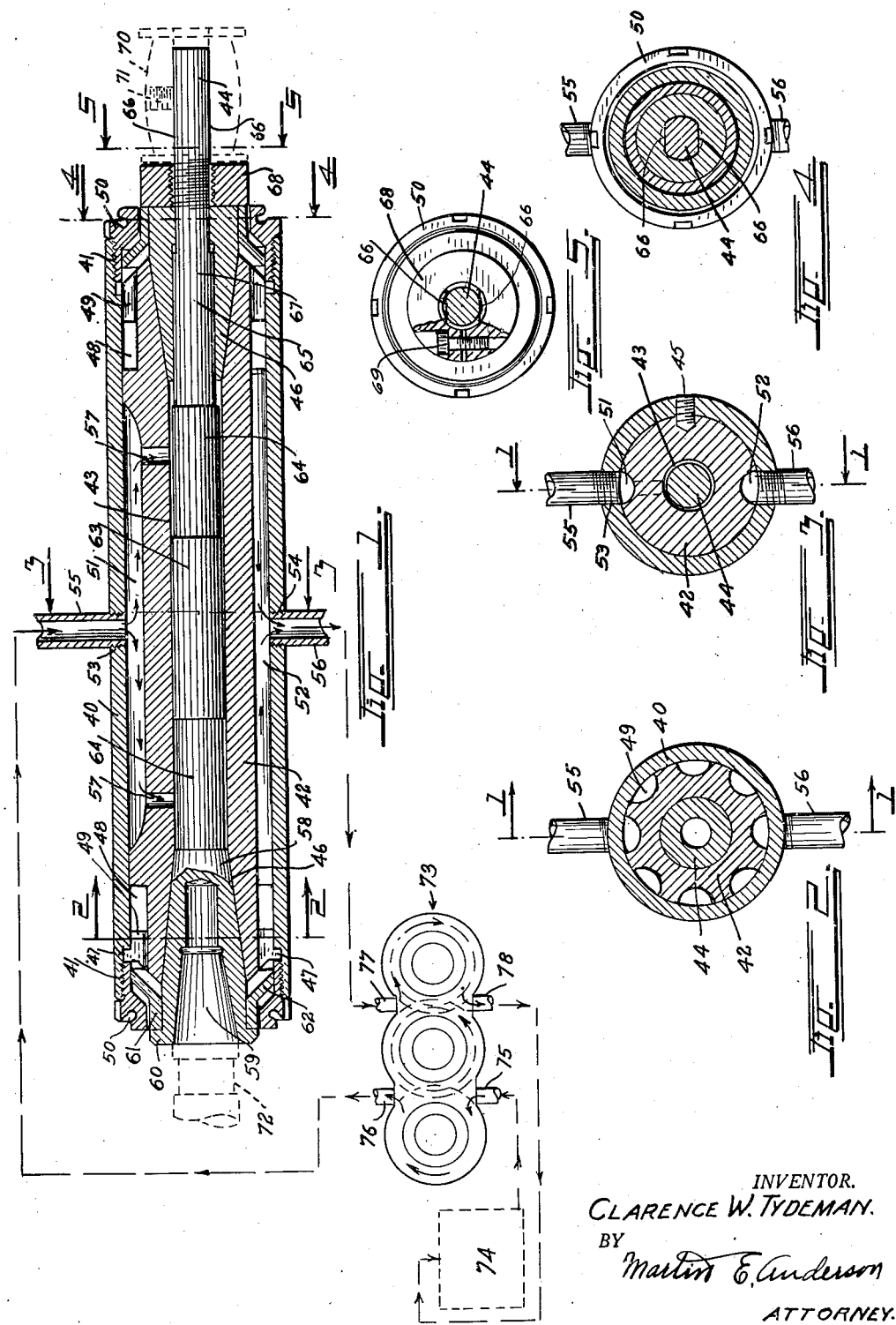
INVENTOR.
CLARENCE W. TYDEMAN.
BY
Martin E. Anderson
ATTORNEY.

Patented May 3, 1949

2,469,186

UNITED STATES PATENT OFFICE 2,469,186

HIGH-SPEED GRINDING SPINDLE

Clarence W. Tydeman, San Mateo County, Calif., assignor to General Engineering and Dry Dock Corporation, San Francisco, Calif., a corporation of Delaware Application June 19, 1947, Serial No. 755,797

6 Claims. (Cl. 308—122)

This invention relates to improvements in high speed grinding spindles of the type shown and described in my copending application, Serial No. 755,796 of even date herewith.

In present day mechanical operations, high speed grinding is frequently employed and for the best results the grinding wheel must rotate at a very high speed, the number of revolutions per minute sometimes reaching 40,000.

It is evident that bearings and spindles used in connection with such high speed grinding equipment must be provided with forced lubrication and with bearings that can be readily adjusted for wear and for optimum operation.

The bearing that forms the subject of the present application is designed primarily for use with grinders of the type employed in cutting screw threads on large cylindrical members, but it can, of course, be employed for any other purpose where similar spindles and bearings are required. However, for simplicity of operation, the spindle and bearing assembly that form the subject of this invention will be considered as pertaining to thread grinding machines.

It is the object of this invention to produce a bearing and spindle assembly of the type and for the purpose indicated which shall be of a simple construction and readily adjustable to compensate for wear.

Another object of the invention is to produce a spindle and bearing assembly that shall have a construction adapting it for lubrication by means of a high pressure lubricating pump that will produce a positive circulation of lubricant between the bearings during the operation so as to assure the presence of the necessary film of oil.

Another object of the invention is to produce a construction that shall have oil seals of such design that they do not frictionally engage any of the parts with which they have relative movement, thereby preventing wear and deterioration of the seal, due to wear.

A further object of the invention is to produce a bearing construction which, in combination with the shaft and bearing surfaces thereon, will not set up forces tending to produce excessive friction when the bearing is subjected to variation in temperature, but which will permit the spindle and the bearing to expand and contract without the production of such objectionable forces.

A still further object of the invention is to produce a spindle and bearing assembly in which two opposed cone bearings are employed, one of which is stationary with respect to the shaft and the other one of which may be adjusted longitudinally to compensate for wear and to effect the proper adjustment for ready rotation while permitting the flow of lubricant.

The above and other objects that may become apparent as this description proceeds are attained by means of a construction and an arrangement of parts that will now be described in detail and for this purpose reference will be had to the accompanying drawing in which the invention has been illustrated in its preferred form, and in which:

Figure 1 is a longitudinal diametrical section taken on lines 1—1, Figures 2 and 3, and shows the parts in their relative positions;

Figure 2 is a section taken on line 2—2, Figure 1;

Figure 3 is a section taken on line 3—3, Figure 1;

Figure 4 is a section taken on line 4—4, Figure 1; and

Figure 5 is a section taken on line 5—5, Figure 1.

In the drawing numeral 40 designates a bearing sleeve which is provided at its end with internally threaded sections 41 of a somewhat larger diameter than the internal diameter of the sleeve. Positioned within the sleeve is a bearing that has been designated in its entirety by reference numeral 42. This bearing comprises a cylindrical member having an axial opening 43 through which the shaft 44 extends. Bearing 42 has an outside diameter making a snug sliding fit with the interior of the sleeve and is held against rotation in the sleeve by some suitable means, such as the screw 45, shown in Figure 3, or by any other equivalent means.

The bearing opening is provided at each end with an outwardly flaring bearing surface 46. One end of the bearing is provided with an outwardly extending flange 47 whose outside diameter is substantially equal to the inside diameter of sections 41. A rectangular groove like that designated by reference numeral 48 is cut in the outer surface of the bearing and is in communication with the ends of the bearing by means of a plurality of grooves 49. A ring 50 is threadedly connected with each threaded section 41. Ring 50, at the left hand end of the drawing, serves to engage the flange 47 and to hold the bearing against longitudinal movement in the bearing sleeve. The frictional resistance, due to this clamping, also serves to prevent the bearing from rotating in the sleeve. The ring 50 at the right hand end does not engage a flange corresponding to flange 47 because this has been omitted to allow the bearing to expand differentially with respect to the sleeve when subjected to variations in temperature. The bearing is provided with two diametrically positioned longitudinally extending grooves 51 and 52. The bearing sleeve has diametrically positioned openings 53 and 54. An oil intake pipe 55 is threadedly connected with the walls of opening 53 and an oil return or discharge pipe 56 is threadedly connected with the wall of opening 54. Two openings 57 communicate the ends of groove 51 with the interior of the bearing.

Shaft 44 is provided at the left hand end, when viewed as in Figure 1, with a frustoconical surface 58 of the proper taper to fit the bearing surface 47. This tapered surface terminates at 59 and extends from these to the outwardly extending flange 60 as a cylindrical surface to which the oil seal ring 61 is connected. The oil seal ring is provided with a frustoconical outwardly and inwardly flaring wall 62 whose inner surface serves as a stop preventing oil from flowing outwardly. When the shaft is rotating at a high speed, any oil that comes in contact with the inner frustoconical surface is thrown outwardly by centrifugal force and flows through grooves 49 into the annular groove 48. The central portion of the shaft which has been designated by reference numeral 63 is of a size providing a freely rotatable fit with the opening in the bearing. On each side of this central section there is a cylindrical section 64 of a somewhat smaller diameter. Openings 57 communicate with the annular space between the outer surface of section 64 and the inner surface of the bearing. The shaft is provided to the right of section 64 with a cylindrical portion 65, the outer portion of which is flattened on opposite sides and designated by reference numeral 66. These flattened portions are shown more clearly in Figure 4. A cone bearing 67 is positioned on section 65 of the shaft and its outer end has an opening that is flattened so as to engage the flattened sides 66 in the manner shown in Figure 4. Cone bearing 67 is longitudinally adjustable and is held in adjusted position by a split nut 68 that is provided with a locking screw 69 by means of which it is clamped to the threaded section with sufficient force to prevent accidental movement. A drive pulley like the one designated by reference numeral 70 and indicated by broken lines in Figure 1 is secured to the outer end of the shaft and held against movement by a set screw 71.

A detachable quill, like the one shown by broken lines and designated by reference numeral 72, is detachably connected with the left hand end of the shaft and this carries the grinding wheel or any other rotatable tool that is to be operated by the spindle.

Since the spindle is to operate at a very high speed, as above mentioned, it is necessary to provide the parts with forced lubrication and for this purpose a double gear pump like the one shown near the left hand end of Figure 1 and designated in its entirety by reference numeral 73 has been provided. This gear pump has not been shown in any great detail as it is merely of conventional construction. The direction of rotation of the gears have been indicated by arrows. The oil is contained in a reservoir 74 that is connected with the intake port 75 of the gear pump to the left. The outlet port 76 is connected by means of suitable piping to the inlet pipe 55. The oil that returns from the bearing through pipe 56 passes from that pipe to the inlet pipe 77 of the gear pump, towards the right. The outlet port 78 of this pump is connected with the oil reservoir by a suitable pipe, as indicated. When the parts are operating and when pump 73 is functioning, oil will be supplied under considerable pressure and will flow in opposite directions from the intake pipe 55, thence through the openings 57 into the space between the spindle and the inner surface of the bearing. The oil will then flow outwardly along the conical bearing surfaces and will finally strike the inner surface of the oil seal rings and after passing through longitudinally extending grooves 49 will pass into the annular grooves 48 and thence through grooves 52 to the outlet pipe 56. This produces a continuous circulation of oil in sufficient volume to keep the parts properly lubricated. The adjustment of the parts is effected by means of nuts 68 in a manner above explained.

By the construction shown and described, an assembly is formed that is capable of very high speed rotation. Any wear can be compensated for by the adjusting features and the spindle and parts are held against relative longitudinal movement by means already described.

Attention is called to the great simplicity of this assembly and to the ease with which it may be assembled and adjusted. It has been found from experience that with the construction shown, there is no leakage of oil from the ends of the bearing because the oil is turned outwardly by the outwardly flaring conical surfaces and since there is no resistance to its return flow to the pump, it passes through grooves 49 into grooves 48 and back to the pump without any loss.

Having described the invention what is claimed as new is:

1. A high speed spindle and bearing assembly, comprising, an elongated sleeve, bearings positioned therein, one near each end thereof, the openings in the bearings being conical and outwardly flaring, means for securing the bearings in a fixed relation relative to each other and to the sleeve, a spindle extending through the bearings, said spindle having a conical bearing sized and shaped for engaging the correspondingly shaped outer bearing near one end of the sleeve, and a conical bearing slidably connected with the other end for operative engagement with the other outer bearing, means for adjusting the movable bearing along the spindle and for securing it in adjusted position, oil seals between the spindle and the outer ends of the sleeve, an oil inlet pipe in communication with the interior of the sleeve, between the two bearings, whereby oil may be introduced thereinto under pressure, and an oil outlet pipe in communication with the interior of the sleeve, between the outer ends of the bearings and the oil seals, whereby any oil that has passed through the bearings will be removed.

2. A high speed spindle and bearing assembly, comprising an elongated sleeve, a tubular bearing positioned therein, means for securing the bearing to the sleeve in a fixed longitudinal and rotary position, the ends of the opening in the tubular bearing terminating in outwardly flaring frustoconical bearing surfaces, a spindle extending through the bearing and through the sleeve, said spindle having a portion of enlarged diameter near one end, whose outer surface is of a size and shape to cooperatively engage the correspondingly frustoconical bearing surface in the tubular bearing, a frustoconical bearing mounted on the other end of the spindle for cooperative engagement with the corresponding frustoconical bearing surface in the tubular bearing, means for adjusting the movable bearing along the spindle and for holding it in adjusted position, an oil inlet pipe having its interior in communication with the interior of the tubular bearing at a point between the outwardly flaring end surfaces, whereby oil introduced under pressure through said pipe will flow outwardly along the frustoconical bearing surfaces, an oil seal between the spindle and the inner surfaces of the sleeve, providing an oil receiving space between the ends of the bearings and the adjacent surfaces of the seals, for the reception of oil that has passed through the bearings, and an oil outlet pipe in communication with both spaces for the removal of oil therefrom.

3. A high speed spindle and bearing assembly, comprising, an elongated sleeve, a tubular bearing positioned therein, the ends of the opening in the bearing being outwardly flared forming frustoconical bearing surfaces, means for securing the bearing and the sleeve in fixed relation, a spindle passing through the tubular bearing and through the sleeve, the spindle having an enlarged portion whose outer surface is frustoconical and inwardly tapered, sized and shaped to operatively engage the corresponding frustoconical bearing surface, a conical bearing secured to the spindle for longitudinal adjustment, in position to cooperatively engage the other frustoconical bearing surface in the tubular bearing, means for adjusting the position of the conical bearing along the spindle and for securing it in adjusted position, the spindle having a section of decreased diameter adjacent the inner end of each bearing, forming with the inner surface of the tubular bearing two annular chambers that are in communication with the inner ends of the bearings, an oil inlet pipe in communication with both of said annular chambers, whereby oil introduced under pressure into said chambers will flow outwardly between the bearing surfaces, oil seal rings secured to the shaft adjacent the outer ends of the bearings, said rings having their inner surfaces outwardly flaring in the direction of the middle of the sleeve, forming chambers for the reception of the oil that has passed through the bearings, and an oil discharge pipe in communication with the last named chambers for conducting the used oil therefrom.

4. A high speed spindle and bearing assembly adapted to be inserted into and secure within an elongated sleeve, comprising, a cylindrical tubular bearing, the ends of the opening terminating in outwardly flaring frustoconical bearing surfaces, a spindle passing through the bearing, said spindle having an enlarged section whose outer surface is frustoconical and inwardly tapering, sized and shaped for operative engagement with the correspondingly shaped bearing surface at one end of the tubular bearing, a conical bearing slidably connected with the spindle in position to operatively engage the frustoconical bearing surface at the other end of the tubular bearing, means comprising a nut threaded to the spindle for moving the conical bearing inwardly along the spindle and for securing it in adjusted position, the tubular bearing having a hole communicating that part of the opening between the bearings, with the outer surface thereof, whereby oil may be introduced, under pressure into the space between the bearings and caused to flow outwardly between the bearing surfaces, and oil seal rings secured to the spindle adjacent the outer ends of the bearings, the sides of the rings facing the bearings, being outwardly flaring in the direction of the center of the bearing.

5. A high speed spindle and bearing assembly, comprising, an elongated sleeve, a tubular bearing therein, means interconnecting the sleeve and bearing to hold them in a relative predetermined position, the opening in the bearing terminating in outwardly flaring frustoconical bearing surfaces, a spindle extending through the bearing, the spindle having an enlarged portion whose outer surface is frustoconical and sized to operatively engage the corresponding surface in the bearing, a conical member slidably connected with the spindle in position to operatively engage the corresponding frustoconical surface of the tubular bearing, means on the spindle for moving the conical member axially and for holding it in adjusted position, the tubular bearing having a passage communicating the space between the end bearing surfaces with the outside thereof, whereby oil may be introduced under pressure into the space between the bearings and caused to flow outwardly between the bearing surfaces, oil seal rings carried by the shaft, adjacent the outer ends of the bearings, the sides of the rings facing the bearings being outwardly flaring towards the middle of the bearing, forming with the outer ends of the bearings, chambers for the reception of lubricating oil that has passed through the bearings, and an oil outlet pipe in communication with both of the last named chambers.

6. In a bearing for a high speed spindle, the sub-combination comprising, a sleeve having its inner surface provided an internally threaded section of greater diameter than the remaining portion of the sleeve, providing an outwardly facing shoulder, an annular nut in operative engagement with said threaded section, a tubular bearing having a diameter substantially equal to the diameter of the sleeve, adapted to be inserted into the sleeve from the end having the section of enlarged diameter and the shoulder, the end of the bearing having an outwardly extending flange of a diameter substantially equal to the diameter of the enlarged sections, whereby it will abut the outwardly facing shoulder in the sleeve and be so positioned that it may be forced against the shoulder by the action of the annular nut, the tubular bearing having a circular groove in its surface adjacent each end, those portions between the grooves and ends being longitudinally fluted to provide oil passages from the ends to the grooves, the central opening in the bearing terminating in outwardly flaring frustoconical bearing surfaces, the wall of the tubular bearing having a hole communicating the interior thereof with a hole in the sleeve, the outer surface of the bearing having a channel interconnecting the two grooves, the sleeve having an opening in communication with the channel.

CLARENCE W. TYDEMAN.

REFERENCES CITED

The following references are of record in the file of this patent:

UNITED STATES PATENTS

| Number | Name | Date |
|---|---|---|
| 1,433,424 | Stoner | Oct. 24, 1922 |
| 2,160,778 | Dall | May 30, 1939 |
| 2,317,981 | De Vlieg | May 4, 1943 |
| 2,344,571 | Turrettini | Mar. 21, 1944 |
| 2,389,687 | Rickenmann | Nov. 27, 1945 |